A. STEDMAN.
Upsetting Tires.
No. 48,110.
Patented June 6, 1865.
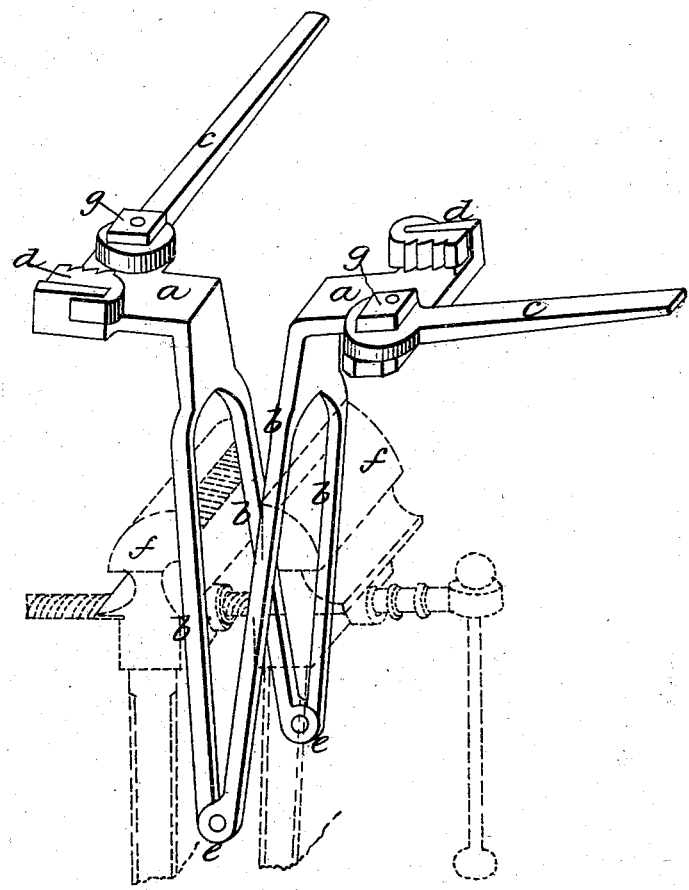
Witnesses:
Chas. Foster
L. A. Randall.
Inventor:
Albert Stedman

UNITED STATES PATENT OFFICE.

ALBERT STEDMAN, OF HOMER, NEW YORK.

IMPROVEMENT IN UPSETTING TIRES.

Specification forming part of Letters Patent No. 48,110, dated June 6, 1865.

*To all whom it may concern:*

Be it known that I, ALBERT STEDMAN, of Homer, in the county of Cortland and State of New York, have invented a new and useful Improvement in Machines for Upsetting or Shortening Tires; and I do hereby declare that the following is a full, clear, and exact description of the construction and operation of the same, reference being had to the annexed drawing, making a part of this specification, in which a perspective view of said machine is given.

Every blacksmith-shop furnishes a common vise. My object is to furnish an apparatus or machine which may be used in connection or combination with such vise, thus dispensing with all that portion of the machines in present use which are necessary only in operating them or in applying power. It is constructed of cast or wrought iron as follows: $a\ a$ are bed-pieces, upon which, at the outer ends, are placed upon the one side toothed or indented projections $d\ d$, and upon the other and opposite to said projections cammed levers $c\ c$, working upon pivots at $g\ g$. Each bed-piece has two arms, $b\ b$, extending downward, and each of these hinged to the corresponding arm on the other at $e\ e$. The tire being heated at any desired point, is placed upon the bed-pieces $a\ a$, and the cammed levers being turned press it against the indented projections $d\ d$, and it is thus held securely in position. The machine is then placed in an open vise represented by the dotted lines $f\ f$, (the forked arms $b\ b$ astride of the screw in the vise.) Now, by screwing up the vise the bed-pieces $a\ a$ are brought together, and, of course, the tire shortened by the distance which such pieces have moved.

I claim as advantages of this machine that it is cheaper, lighter, less cumbersome, and more easily handled and managed than any other in use, and is adapted to be used in any common use.

I do not claim any of the parts of the said machine separately; but

What I do claim, and desire to secure by Letters Patent, is—

The machine or apparatus as a whole when used in connection or combination with any vise, as and for the purposes above set forth.

ALBERT STEDMAN.

Witnesses:
CHAS. FOSTER,
L. A. RANDALL.